(12) United States Patent
Richards

(10) Patent No.: US 9,866,764 B2
(45) Date of Patent: Jan. 9, 2018

(54) METHOD AND APPARATUS FOR SYNCHRONIZING AUTO EXPOSURE BETWEEN CHROMATIC PIXELS AND PANCHROMATIC PIXELS IN A CAMERA SYSTEM

(71) Applicant: Motorola Mobility LLC, Chicago, IL (US)

(72) Inventor: By-Her W Richards, Lincolnshire, IL (US)

(73) Assignee: Motorola Mobility LLC, Chicago, IL (US)

( * ) Notice: Subject to any disclaimer, the term of this patent is extended or adjusted under 35 U.S.C. 154(b) by 21 days.

(21) Appl. No.: 14/860,778

(22) Filed: Sep. 22, 2015

(65) Prior Publication Data

US 2017/0085806 A1 Mar. 23, 2017

(51) Int. Cl.
*H04N 9/04* (2006.01)
*H04N 9/77* (2006.01)
*H04N 9/73* (2006.01)
*H04N 5/243* (2006.01)
*H04N 5/247* (2006.01)

(52) U.S. Cl.
CPC ............ *H04N 5/243* (2013.01); *H04N 5/247* (2013.01); *H04N 9/04* (2013.01)

(58) Field of Classification Search
CPC .. H04N 1/6086; H04N 5/243; H04N 5/35563; H04N 5/23232; H04N 5/2355; H04N 5/2351; H04N 5/2353; G03B 7/08
USPC ........... 348/135, 222.1, 224.1, 362, 364–366
See application file for complete search history.

(56) References Cited

U.S. PATENT DOCUMENTS 7,855,740 B2 * 12/2010 Hamilton, Jr. ....... H04N 5/3452
  348/266
8,274,715 B2 9/2012 Hamilton, Jr. et al.
8,514,491 B2 8/2013 Duparre
(Continued)

FOREIGN PATENT DOCUMENTS

WO 2014032259 A1 3/2014

OTHER PUBLICATIONS

By-Her W. Richards, et al., "Multiple Camera Apparatus and Method for Synchronized Auto White Balance", U.S. Appl. No. 14/579,111, filed Dec. 22, 2014.
(Continued)

*Primary Examiner* — Kelly L Jerabek
(74) *Attorney, Agent, or Firm* — Matthew C. Loppnow; Watson Intellectual Property Group

(57) ABSTRACT

A method and apparatus synchronize auto exposure between chromatic pixels and panchromatic pixels in a camera system. A first exposure can be determined for different chromatic pixels that detect different color light. An illumination type of a scene can be detected. An exposure ratio between the chromatic pixels and panchromatic pixels can be ascertained based on the illumination type of the scene. A second exposure can be determined for the panchromatic pixels that detect panchromatic light. The first exposure can be different from the second exposure based on the exposure ratio between the chromatic pixels and the panchromatic pixels with respect to an illumination type of a scene. Then, at least one image of the scene can be captured using the first exposure for the different chromatic pixels and the second exposure for the panchromatic pixels.

22 Claims, 10 Drawing Sheets

(56) References Cited

U.S. PATENT DOCUMENTS

| | | | |
|---|---|---|---|
| 9,225,889 B1* | 12/2015 | Korkin | H04N 5/2258 |
| 2008/0012969 A1 | 1/2008 | Kasai | |
| 2010/0253833 A1* | 10/2010 | Deever | H04N 5/3456 |
| | | | 348/362 |
| 2010/0265370 A1* | 10/2010 | Kumar | G06T 3/4015 |
| | | | 348/280 |
| 2011/0102638 A1 | 5/2011 | Susanu | |
| 2011/0310278 A1 | 12/2011 | Bai | |
| 2013/0193311 A1 | 8/2013 | Yoshida | |
| 2013/0242131 A1 | 9/2013 | Timm | |
| 2013/0342740 A1* | 12/2013 | Govindarao | H04N 9/09 |
| | | | 348/262 |
| 2016/0117800 A1* | 4/2016 | Korkin | H04N 5/2258 |
| | | | 348/239 |
| 2016/0173793 A1* | 6/2016 | Mitsunaga | H04N 5/3745 |
| | | | 348/229.1 |
| 2016/0182874 A1* | 6/2016 | Richards | H04N 9/735 |
| | | | 348/187 |

OTHER PUBLICATIONS

By-Her W. Richards, et al., Multiple Camera Apparatus and Method for Synchronized Autofocus, U.S. Appl. No. 14/549,735, filed Nov. 21, 2014.

Williams, Dilwyn, "Combined Search and Examination Report," GB Intellectual Property Office, dated Mar. 28, 2017, pp. 1-9, South Wales, GB.

* cited by examiner

METHOD AND APPARATUS FOR SYNCHRONIZING AUTO EXPOSURE BETWEEN CHROMATIC PIXELS AND PANCHROMATIC PIXELS IN A CAMERA SYSTEM

CROSS-REFERENCE TO RELATED APPLICATIONS

This application is related to an application entitled "MULTIPLE CAMERA APPARATUS AND METHOD FOR SYNCHRONIZED AUTO WHITE BALANCE," application Ser. No. 14/579,111, filed on Dec. 22, 2014, and commonly assigned to the assignee of the present application, which is hereby incorporated by reference, and an application entitled "MULTIPLE CAMERA APPARATUS AND METHOD FOR SYNCHRONIZED AUTOFOCUS," application Ser. No. 14/549,735, filed on Nov. 21, 2014, and commonly assigned to the assignee of the present application, which is hereby incorporated by reference.

BACKGROUND

1. Field

The present disclosure is directed to an automatic exposure algorithm in imaging devices such as digital cameras. More particularly, the present disclosure is directed to a method and apparatus for synchronizing auto exposure between chromatic pixels and panchromatic pixels in a camera system.

2. Introduction

Presently, people enjoy taking pictures of friends, family, children, vacations, flowers, landscapes, and other scenes using digital cameras. Some cameras now use panchromatic, such as clear, pixels along with chromatic pixels, such as Red, Green, and Blue (RGB) pixels for improved image quality. In such single or multiple camera systems, the spectral response of chromatic pixels is lower than panchromatic pixels. This means the received light at the same exposure time is different between chromatic pixels and panchromatic pixels without adjusting the exposure of the different types of pixels. Unfortunately, such a difference in exposure results in underexposed chromatic pixels and/or overexposed panchromatic pixels. For example, if an exposure for a scene is set for the chromatic pixels, the panchromatic pixels will be overexposed. Also, if an exposure for a scene is set for the panchromatic pixels, the chromatic pixels will be underexposed.

Thus, there is a need for a method and apparatus for synchronizing auto exposure between chromatic pixels and panchromatic pixels in a camera system.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Embodiments provide a method and apparatus for synchronizing auto exposure between chromatic pixels and panchromatic pixels in a camera system. According to a possible embodiment, a first exposure can be determined for different chromatic pixels that detect different color light. An illumination type of a scene can be detected. An exposure ratio between the chromatic pixels and panchromatic pixels can be ascertained based on the illumination type of the scene. A second exposure can be determined for the panchromatic pixels that detect panchromatic light. The first exposure can be different from the second exposure based on the exposure ratio between the chromatic pixels and the panchromatic pixels with respect to the illumination type of a scene. Then, at least one image of the scene can be captured using the first exposure for the different chromatic pixels and the second exposure for the panchromatic pixels, simultaneously.

Embodiments can synchronize exposure between panchromatic pixels and chromatic pixels. For example, embodiments can use an exposure synchronization algorithm between panchromatic pixels and chromatic pixels to avoid over-exposing panchromatic pixels, and/or to avoid under-exposing chromatic pixels. Such embodiments can use a modern sensor, such as a Complementary Metal-Oxide-Semiconductor (CMOS) sensor, that can set different exposure times on two groups of pixels of the same sensor.

Figure 1:
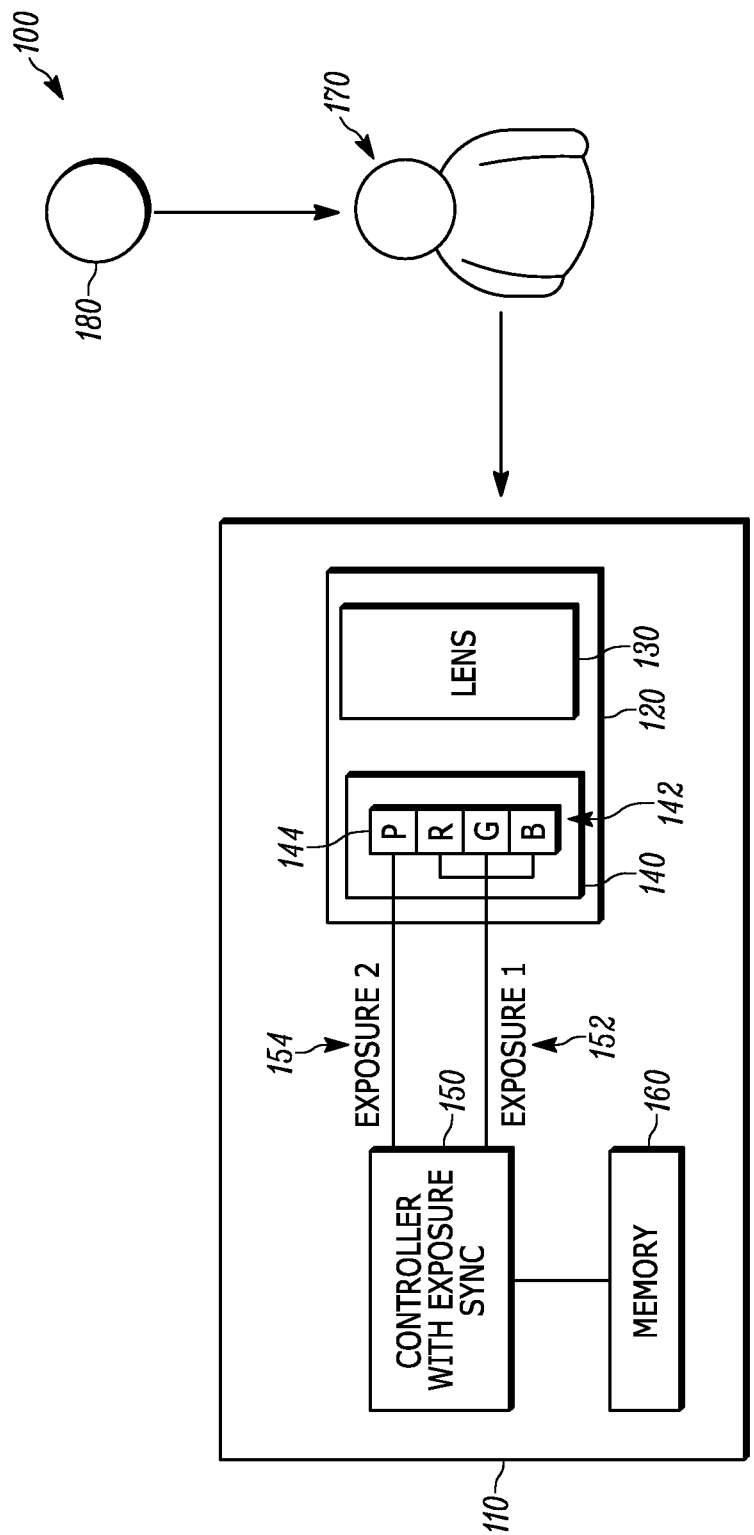
FIG. 1 is an example illustration of a system according to a possible embodiment.

FIG. 1 is an example illustration of a system 100 according to a possible embodiment. The system 100 can include an apparatus 110 and a scene 170 illuminated by a light source 180, such as an illuminant. The apparatus 110 can be a compact camera, a Digital Single Lens Reflex (DSLR) camera, a mirrorless camera, a smartphone, a cellular telephone, a selective call receiver, a gaming device, a set-top box, a wearable device, a wristwatch, a camcorder, a tablet computer, a personal computer, or any other apparatus that can include a camera unit. For example, the apparatus 100 can include at least one camera unit 120, a controller 150 that includes exposure synchronization logic, and a memory 160. The controller 150 can be a processor, an image signal processor, a separate processor and image processing pipeline module, software, hardware, one unit, multiple units, or any other controller that can control operations on an apparatus including at least one camera unit. The camera unit 120 can include a lens 130 and a sensor 140. The sensor 140 can be a semiconductor Charge-Coupled Device (CCD) sensor, a CMOS sensor, an N-type Metal-Oxide-Semiconductor (NMOS) sensor, or any other sensor that can capture an image. The sensor 140 can include chromatic pixels 142 and panchromatic pixels 144. The chromatic pixels can include the Red, Green, and Blue (RGB) pixels as shown or can include any other type of chromatic pixels, such as Cyan, Yellow, Green, Magenta (CYGM) pixels, or any other chromatic pixels. The panchromatic pixels 144 can be clear pixels that can sense all visible light. Only one set of a combination of chromatic 142 and panchromatic 144 pixels is shown for illustrative purposes, but it is understood that the sensor 140 can include millions of pixels.

In operation, a first exposure 152 can be determined for the different chromatic pixels 142 that detect different color light. A second exposure 154 can be determined for the panchromatic pixels 144 that detect panchromatic light. The first exposure 152 can be different from the second exposure 154 based on an exposure ratio between the chromatic pixels 142 and the panchromatic pixels 144 with respect to the illumination type of a scene. The exposure ratio can be based on the type of light source 180 illuminating the scene 170. At least one image of the scene 170 can be captured using the first exposure 152 for the different chromatic pixels 142 and the second exposure 154 for the panchromatic pixels 144.

According to a possible embodiment, received light with respect to various illumination types can be measured. For example, an Auto White Balance (AWB) algorithm in the controller 150, such as in an image signal processor unit, can detect the illumination type, such as a type of light source, of a scene. Then, an exposure ratio, between the chromatic pixels and the panchromatic pixels, for the illumination type can be calculated beforehand, or at real time. An exposure table can be designed for the chromatic pixels, in order to work with an auto exposure algorithm for the chromatic pixels. An exposure table can be designed for the panchromatic pixels, in order to work with an auto exposure algorithm for the panchromatic pixels. A table of exposure ratio, described in the embodiments, can eliminate one exposure table, either for the chromatic pixels, or for the panchromatic pixels. If the auto exposure algorithm, and the exposure table of the chromatic pixels are used to find an optimal exposure per scene, then the table of the exposure ratio can be used to derive the exposure of the panchromatic pixels. If the auto exposure algorithm, and the exposure table of the panchromatic pixels are used to find an optimal exposure per scene, then the table of the exposure ratio can be used to derive the exposure of the chromatic pixels. A table of exposure ratio can be stored in the memory 160 for panchromatic pixels or for chromatic pixels. Alternately, the exposure ratio can be generated by exposure ratio generation logic in the controller 150 in real time and used for the exposure of the panchromatic pixels or chromatic pixels.

The exposure ratio can be used in different strategies. For one strategy, the same sensor gain on both panchromatic pixels and chromatic pixels can be set. Then, the exposure time of chromatic pixels and the exposure time of panchromatic pixels can satisfy the exposure ratio. In general, the exposure time of chromatic pixels can be longer than the exposure time of panchromatic pixels. For another strategy, the same exposure time on both panchromatic pixels and chromatic pixels can be set. Then, the sensor gain of chromatic pixels and the sensor gain of panchromatic pixels can satisfy the exposure ratio. In general, the sensor gain of chromatic pixels can be higher than the sensor gain of panchromatic pixels. Other strategies can involve sensing exposure based on aperture size and other factors that affect exposure.

The same idea can be extended to a multiple camera system with various apertures. The received light per camera can be calculated with respect to its pixel types and its aperture (F-number) per illumination type. Then, an exposure ratio can be generated to determine the exposure one of the panchromatic pixels or chromatic pixels from the other of the panchromatic pixels or chromatic pixels.

Figure 2:
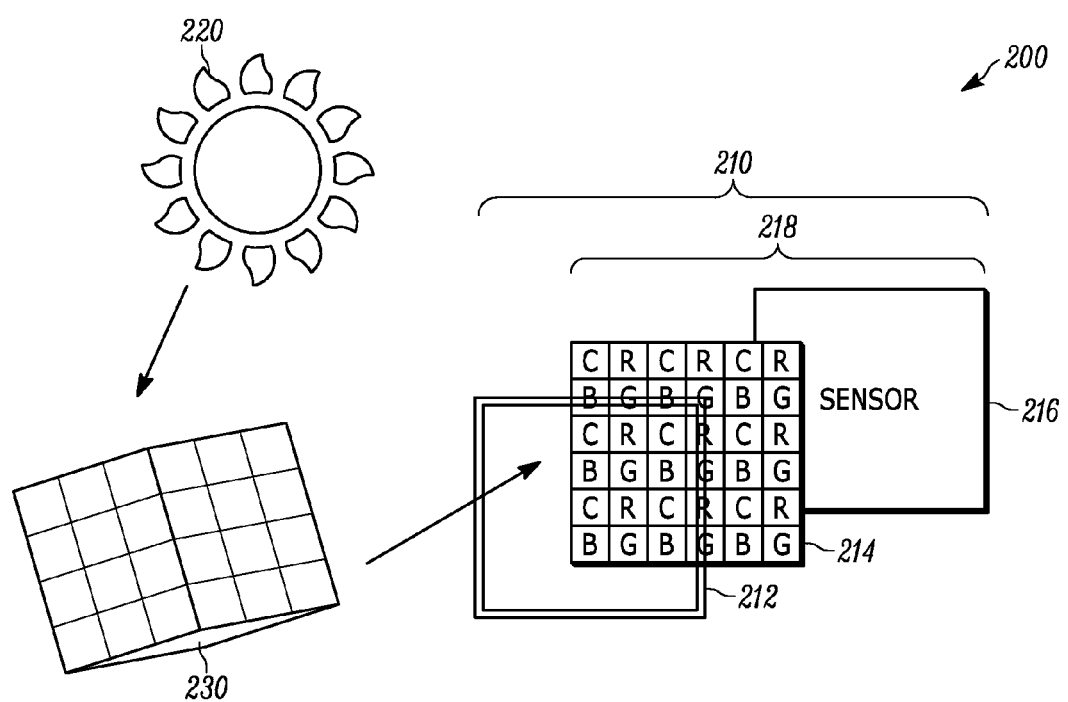
FIG. 2 is an example illustration of simulation model for light received on a camera unit according to a possible embodiment.

FIG. 2 is an example illustration of simulation model 200 for light received on a camera unit 210, such as the camera unit 120, according to a possible embodiment. The camera unit 210 can include an infrared-cut (IR-cut) filter 212, a Red, Green, Blue, and Clear (RGBC) pixel pattern 214, and a sensor 216. The camera unit 210 and/or an apparatus, such as the apparatus 110, including the camera unit 210 can also include other elements, such as the lens 130, the controller 150, and the memory 160. While shown separately, the RGBC pixel pattern 214 can be part of the sensor 216 and when combined, the RGBC pixel pattern 214 and the sensor 216 can be considered an RGBC sensor 218. A clear (C) pixel can be equivalent to a panchromatic pixel. The RGBC pixel pattern 230 can also be any other pixel pattern that includes chromatic and panchromatic pixels. The simulation model 200 can also include an illuminant, such as a light source, 220 and a subject 230, such as a subject in a scene.

Figure 3:
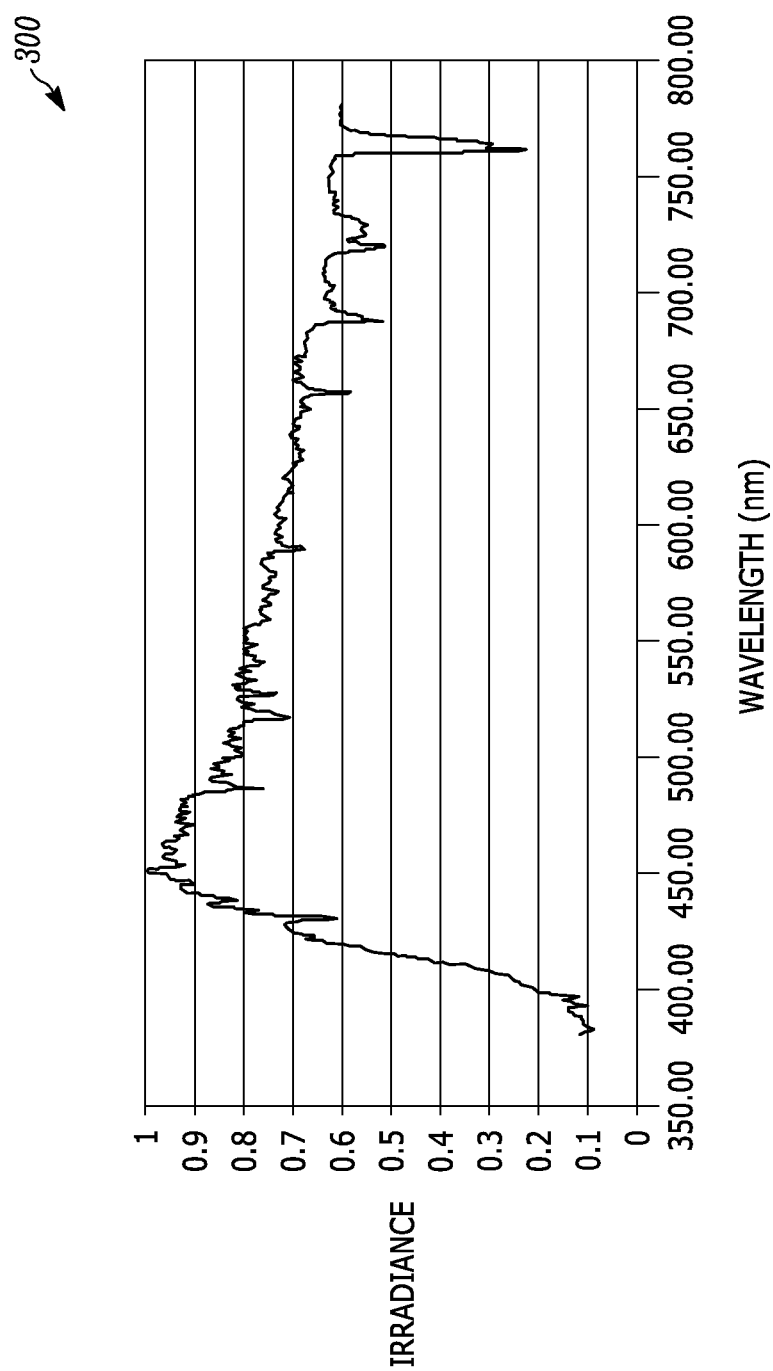
FIG. 3 is an example graph of a spectral response of an illumination type, such as sunlight, according to a possible embodiment.
Figure 4:
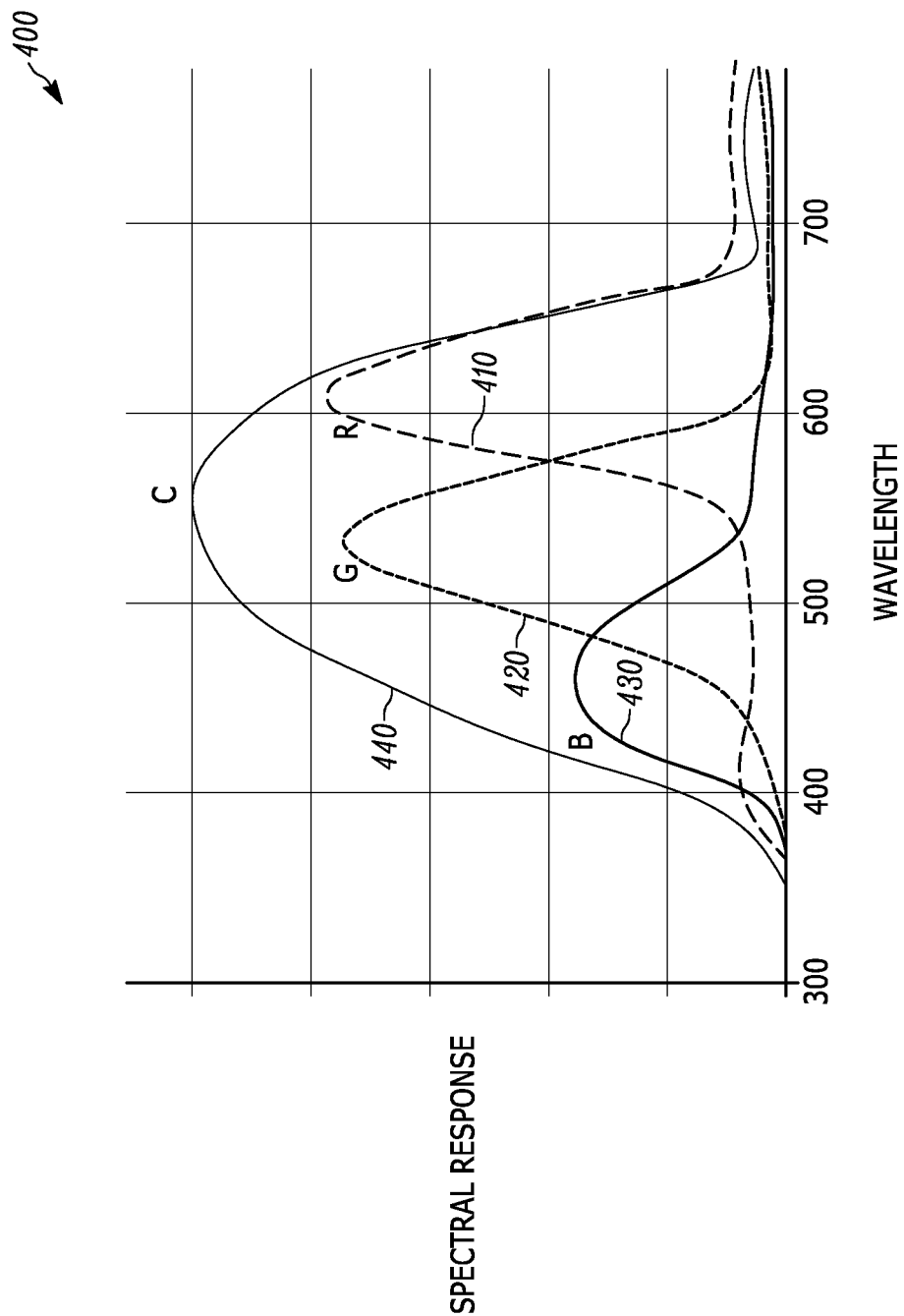
FIG. 4 is an example graph of a spectral response of a red, green, blue, and clear pixels according to a possible embodiment.
Figure 5:
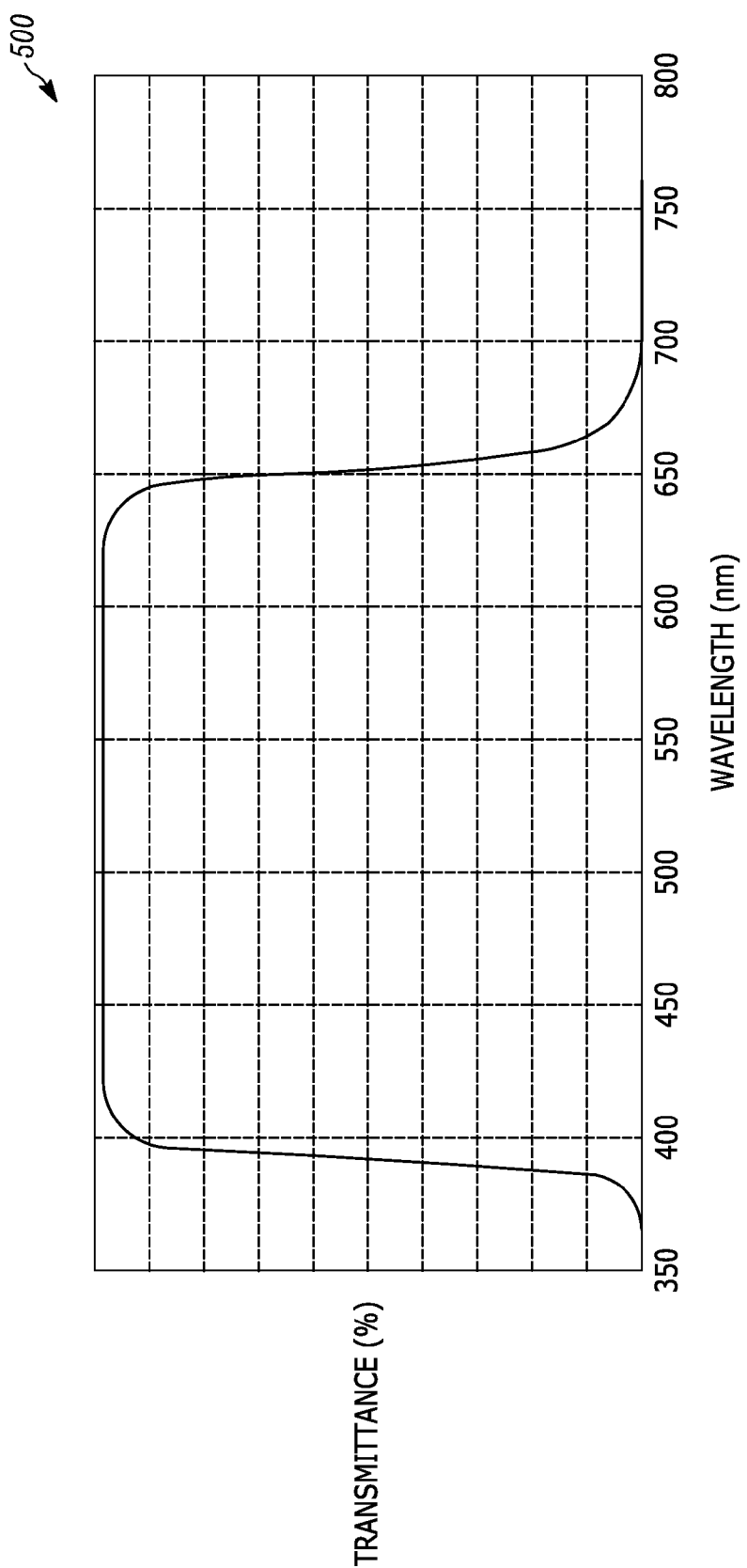
FIG. 5 is an example graph of a transmissive curve of an IR-cut filter according to a possible embodiment.

FIG. 3 is an example graph 300 of a spectral response of an illumination type, such as sunlight, according to a possible embodiment. FIG. 4 is an example graph 400 of a spectral response of a red, green, blue, and clear (panchromatic) pixels, such as in an RGBC sensor, other sensors, and/or multiple sensors, according to a possible embodiment. The graph 400 can include the spectral response of red pixels 410, the spectral response of green pixels 420, the spectral response of blue pixels 430, and the spectral response of clear, such as panchromatic, pixels 440. FIG. 5 is an example graph 500 of a transmissive curve of an IR-cut filter according to a possible embodiment.

For this specific RGBC sensor 218, the percentage of red, green, blue, and clear pixels per full image can result in the following respective weighting numbers:

$$w_R = \frac{1}{4}; w_G = \frac{1}{4}; w_B = \frac{1}{4}; \text{and } w_C = \frac{1}{4}.$$

To calculate the light received on the panchromatic, such as clear, pixels, first a panchromatic signal S1_Clear can be calculated based on (Clear Pixels)×(*IR*)×(Illuminant), where the values of each multiplicand can be equal to the Y-axis value per specific wavelength, under the curves 440, 500, and 300, respectively. For example, for every data point at the same wavelength, a product of the spectral response of a Clear Channel, the spectral response of an Illuminant, and the transmittance (%) of an IR-cut Filter can be calculated. Then, S1_Clear is the summed area of this product curve with respect to wavelength.

Then, the light received on the panchromatic pixels (C), Light_clear, can be determined by multiplying the signal S1_clear by the weighting percentage $w_e$:

Light_clear=S1_Clear×$w_e$.

To calculate the light received on the chromatic pixels, first, chromatic signals S1_R, S1_G, and S1_B for each type of chromatic pixels can be calculated based on $$(R,G,B) \times (IR) \times (\text{Illuminant})$$

similarly to the product array, calculated for the signal S1_clear and using the curves 410, 420, and 430, respectively, for the chromatic pixels. For example, for every data point at the same wavelength, a product of spectral responses of a color channel, an illuminant, and a transmittance (%) of an IR-cut Filter can be calculated. Then, S1_R can be the summed area of the product curve of red channel with respect to wavelength. S1_G can be the summed area of the product curve of green channel with respect to wavelength. S1_B can be the summed area of the product curve of bed channel with respect to wavelength.

Then, the light received on the chromatic pixels (RGB) Light_rgb can be determined by multiplying each signal by its respective weighting percentage and adding the results:

$$\text{Light\_rgb} = S1\_R \times w_R + S1\_G \times w_G + S1\_B \times w_B.$$

Then, the exposure ratio between chromatic pixels and panchromatic pixels can be Light_clear/Light_rgb. For example, if the sensor gain is set to the same for both groups of pixels,

[Exposure Time of Chromatic Pixels]×Light_rgb=
[Exposure Time of Panchromatic Pixels]×Light_clear.

If the exposure time is set to the same for both groups of pixels,

[Sensor Gain of Chromatic Pixels]×Light_rgb=[Sensor Gain of Panchromatic Pixels]×Light_clear.

Figure 6:
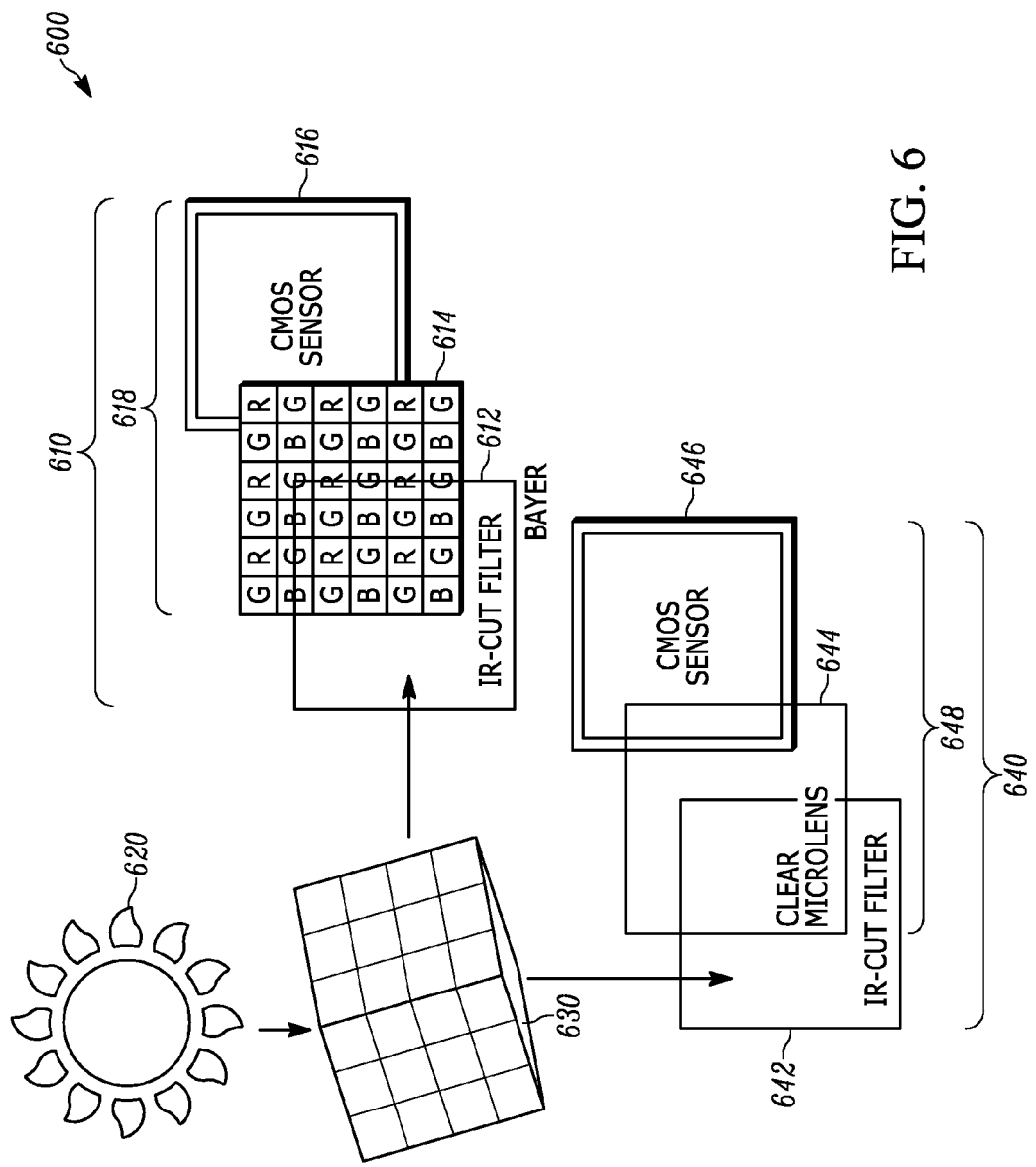
FIG. 6 is an example illustration of simulation model for light received on a dual camera system including a first camera unit and a second camera unit according to a possible embodiment.

FIG. 6 is an example illustration of simulation model 600 for light received on a dual camera system including a first camera unit 610 and a second camera unit 640, each which can be part of apparatus, such as the apparatus 110, according to a possible embodiment. The first camera unit 610 can include an infrared-cut (IR-cut) filter 612, a Bayer Red, Green, and Blue (RGB) pixel pattern 614, and a sensor 616. While shown separately, the RGB pixel pattern 614 can be part of the sensor 616 and when combined, the RGB pixel pattern 614 and the sensor 616 can be considered an RGB Bayer sensor 618. The second camera unit 640 can include an infrared-cut (IR-cut) filter 642, a clear microlens 644, and a sensor 646. While shown separately, the clear microlens 644 can be part of the sensor 646 and when combined, the clear microlens 644 and the sensor 646 can be considered a panchromatic sensor 648. The camera units 610 and 640 and/or an apparatus, such as the apparatus 110, including the camera units 610 and 640 can also include other elements, such as the lens 130, the controller 150, and the memory 160. The simulation model 600 can also include an illuminant, such as a light source, 620 and a subject 630, such as a subject in a scene.

To make this dual camera system more general, the two camera units 610 and 640 may have different apertures (F-numbers), and different pixel size, which can affect the exposure of the sensors 618 and 648. Let the F-number of the camera unit 610 with the RGB Bayer sensor 618 be F#_rgb, and the F-number of the camera unit 640 with the panchromatic sensor 648 be F#_clear. Also, let the unit pixel area of the camera unit 610 with the RGB Bayer sensor 618 Unit_Pixel_Area_rgb, and the unit pixel area of the camera unit 640 with the panchromatic sensor 648 be Unit_Pixel_Area_clear.

For this dual camera system, the percentage of (R, Gr, Gb, B, C) pixels for two full images (one Bayer image, and one clear image) can have the following weighting numbers:

$$w_R = \frac{1}{8}; w_{G\_R} = \frac{1}{8}; w_{G\_B} = \frac{1}{8}; w_B = \frac{1}{8}; \text{ and } w_C = \frac{1}{2}.$$

To calculate the light received on the panchromatic, such as clear, pixels, first a panchromatic signal S1_Clear can be calculated based on (Clear Pixels)×(IR)×(Illuminant).

For every data point at the same wavelength, a product of spectral responses of Clear Channel and Illuminant, and Transmittance (%) of IR-cut Filter can be calculated. Then, S1_Clear can be the summed area of this product curve with respect to wavelength. Then, the light received on the panchromatic pixels (C), Light_clear, can be determined by multiplying the signal S1_clear by the weighting percentage $w_e$ and the Unit_Pixel_Area_clear divided by the aperture (F-number F#_clear) squared:

Light_clear=S1_Clear×$w_e$×1/(F#_clear^2)×Unit_Pixel_Area_clear.

To calculate the light received on the chromatic pixels, first, chromatic signals S1_R, S1_Gr, S1_Gb, and S1_B for each type of chromatic pixels can be calculated based on (R,Gr,Gb,B)×(IR)×(Illuminant).

For example, for every data point at the same wavelength, a product of spectral responses of a color channel, an illuminant, and a transmittance (%) of an IR-cut Filter can be calculated. Then, S1_R can be the summed area of the product curve of red channel with respect to wavelength. S1_Gr can be the summed area of the product curve of Gr channel (green pixels shared the same row with red pixels) with respect to wavelength. S1_Gb can be the summed area of the product curve of Gb channel (green pixels shared the same row with blue pixels) with respect to wavelength. S1_B can be the summed area of the product curve of bed channel with respect to wavelength.

Then, the light received on the chromatic pixels (RGB) Light_rgb can be determined by multiplying each signal by its respective weighting percentage, adding the results, and multiplying the result by the Unit_Pixel_Area_rgb divided by the aperture (F-number F#_rgb) squared:

Light_rgb=(S1_R×$w_R$+S1_Gr×$w_{Gr}$+S1_Gb×$w_{Gb}$+S1_B×$w_B$)×1/(F#_rgb^2)×Unit_Pixel_Area_rgb.

Then, the exposure ratio between chromatic pixels and panchromatic pixels can be Light_clear/Light_rgb. For example, if the sensor gain is set to the same for both groups of pixels,

[Exposure Time of RGB Bayer Sensor]×Light_rgb=
[Exposure Time of Panchromatic Sensor]×Light_clear.

If the exposure time is set to the same for both groups of pixels,

[Sensor Gain of RGB Bayer Sensor]×Light_rgb=
[Sensor Gain of Panchromatic Pixels]×Light_clear.

In these cases the sensor gain of the sensor can be equivalent to the gain of the pixels in the previous embodiment.

To summarize, the first camera unit 610, such as a first camera, can include a lens 130 and a sensor 140 that includes the chromatic pixels 142. The sensor 140 of the first camera unit 610 can sense different color light on different chromatic pixels and can capture a first image of the scene on the different chromatic pixels using the first exposure for the different chromatic pixels. The second camera unit 640, such as a second camera, can include a lens 130 and a sensor 140 that includes the panchromatic pixels 144. The sensor 140 of the second camera can sense panchromatic light on panchromatic pixels and can simultaneously capture a second image of the scene on the panchromatic pixels using the second exposure for the panchromatic pixels. The second exposure can be different from the first exposure based on an exposure ratio.

Figure 7:
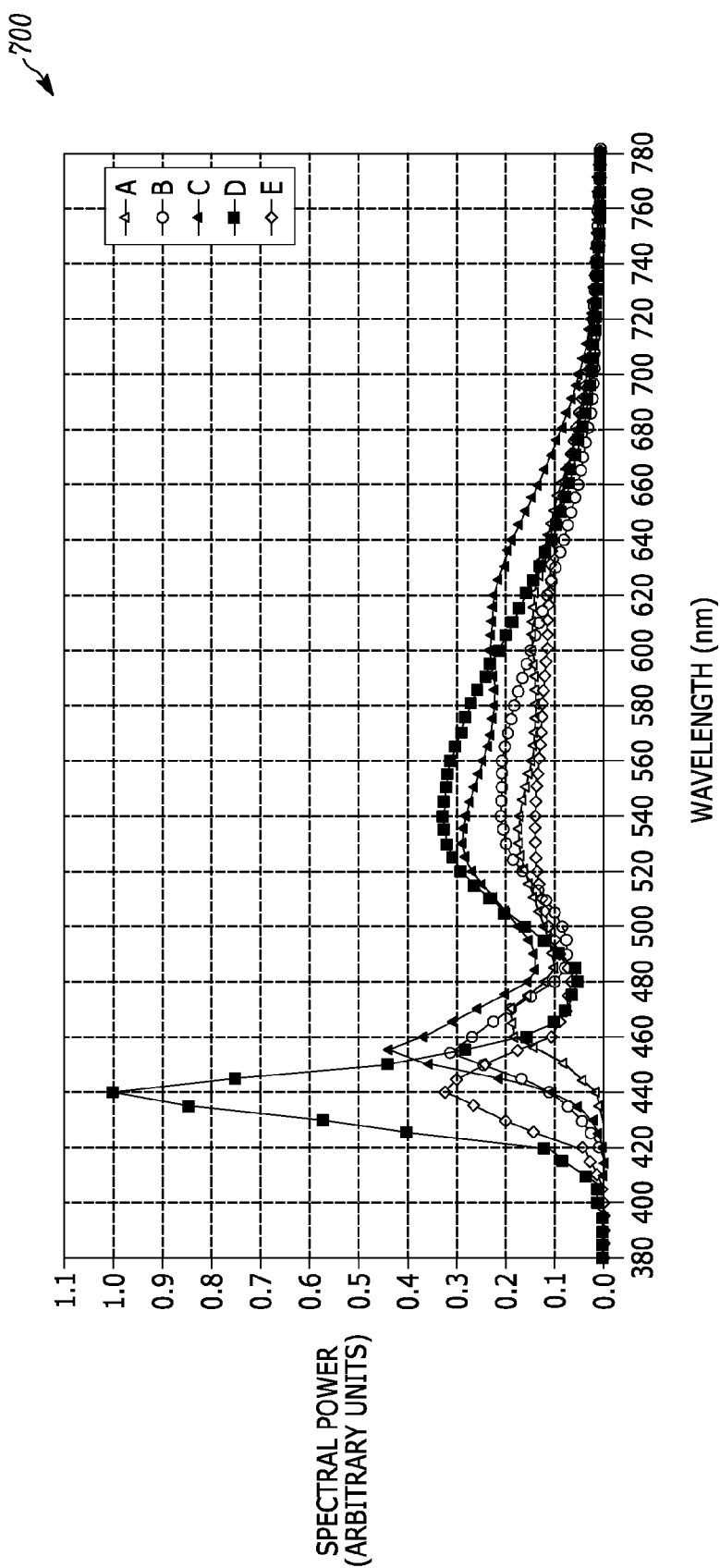
FIG. 7 is an example graph illustrating spectral responses of Light Emitting Diode (LED) flash lights on five phones according to a possible embodiment.

FIG. 7 is an example graph 700 illustrating spectral responses of LED Flash lights on five phones according to a possible embodiment. According to this implementation of a dual camera system, the camera unit 610 and the camera unit 640 can have the same aperture (F-number) to demonstrate the calculation of a single Correlated Color Temperature (CCT) LED Flash Mode, where a flash is the illuminant 620. When using a Single CCT LED Flash Mode, the spectral response of the illuminant 620 can be fixed for all the captures. Therefore, the exposure ratio can be fixed per camera system using such a flash mode.

For this dual camera system, the percentage of (R, Gr, Gb, B, C) pixels for two full images (one Bayer image, and one clear image) can have the following weighting numbers:

$$w_R = \frac{1}{8}; w_{G\_R} = \frac{1}{8}; w_{G\_B} = \frac{1}{8}; w_B = \frac{1}{8}; \text{ and } w_C = \frac{1}{2}.$$

To calculate the light received on the panchromatic, such as clear, pixels, first a panchromatic signal S1_Clear can be calculated based on (Clear Pixels)×(IR)×(Illuminant).

For every data point at the same wavelength, a product of spectral responses of Clear Channel and Illuminant, and Transmittance (%) of IR-cut Filter can be calculated. Then, S1_Clear can be the summed area of this product curve with respect to wavelength. Then, the light received on the panchromatic pixels (C), Light_clear, can be determined by multiplying the signal S1_clear by the weighting percentage $w_e$ and the Unit_Pixel_Area_clear:

Light_clear=S1_Clear×$w_e$×Unit_Pixel_Area_clear.

To calculate the light received on the chromatic pixels, first, chromatic signals S1_R, S1_Gr, S1_Gb, and S1_B for each type of chromatic pixels can be calculated based on (R,Gr,Gb,B)×(IR)×(Illuminant).

For example, for every data point at the same wavelength, a product of spectral responses of a color channel, an illuminant, and a transmittance (%) of an IR-cut Filter can be calculated. Then, S1_R can be the summed area of the product curve of red channel with respect to wavelength. S1_Gr can be the summed area of the product curve of Gr channel (green pixels shared the same row with red pixels) with respect to wavelength. S1_Gb can be the summed area of the product curve of Gb channel (green pixels shared the same row with blue pixels) with respect to wavelength. S1_B can be the summed area of the product curve of bed channel with respect to wavelength.

Then, the light received on the chromatic pixels (RGB) Light_rgb can be determined by multiplying each signal by its respective weighting percentage, adding the results, and multiplying the result by the Unit_Pixel_Area_rgb:

Light_rgb=(S1_R×$w_R$+S1_$G_r$×$w_{G_r}$+S1_$G_b$×$w_{Gb}$+ S1_B×$w_B$)×Unit_Pixel_Area_rgb.

Then, the exposure ratio between chromatic pixels and panchromatic pixels can be Light_clear/Light_rgb. For example, if the sensor gain is set to the same for both groups of pixels,

[Exposure Time of RGB Bayer Sensor]×Light_rgb= [Exposure Time of Panchromatic Sensor]× Light_clear.

If the exposure time is set to the same for both groups of pixels,

[Sensor Gain of RGB Bayer Sensor]×Light_rgb= [Sensor Gain of Panchromatic Pixels]×Light_clear.

For a Dual CCT LED Flash Mode, the spectral response of a dual LED illuminant can vary with the scene illuminant along with the dual LED illuminant. Therefore, the exposure ratio can vary per scene. When a Dual CCT LED Flash light is chosen, spectral responses at various CCTs can be measured and the exposure ratio per CCT can be saved in a Look-up-table (LUT).

Figure 8:
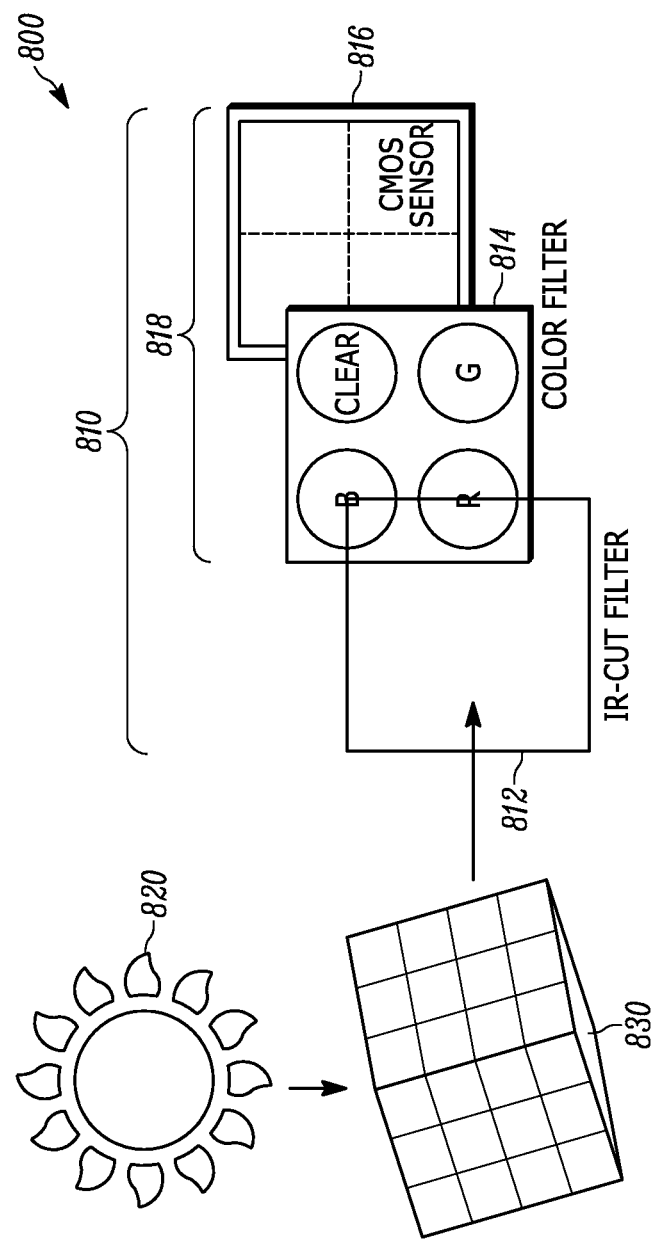
FIG. 8 is an example illustration of simulation model for light received on a 2×2 array camera unit according to a possible embodiment.

FIG. 8 is an example illustration of simulation model 800 for light received on a 2×2 array camera unit 810, such as the camera unit 120, according to a possible embodiment. The camera unit 810 can include an infrared-cut (IR-cut) filter 812, a color filter 814, and a sensor 816. The camera unit 810 and/or an apparatus, such as the apparatus 110, including the camera unit 810 can also include other elements, such as the lens 130, the controller 150, and the memory 160. The color filter 814 can be separate from the sensor 816. Alternately, the color filter 814 and the sensor 816 can be considered a combined component of sensor and RGBC filters 818. A pixel, on the sensor, behind the clear filter is a clear (C) pixel, which can be equivalent to a panchromatic pixel. For the 2×2 array camera unit 810, the sensor 816 can be divided into quadrants, where the pixels in a given quadrant can receive light through one of the R, G, B, or C filters in the color filter 814. The simulation model 800 can also include an illuminant, such as a light source, 820 and a subject 830, such as a subject in a scene.

For the combined component of sensor and RGBC filters 818 in the 2×2 camera unit 810, the percentage of (R, G, B, C) pixels per full image can result in the following weighting numbers:

$$w_R = \frac{1}{4}; w_G = \frac{1}{4}; w_B = \frac{1}{4}; \text{ and } w_C = \frac{1}{4}.$$

To calculate the light received on the panchromatic, such as clear, pixels, first a panchromatic signal S1_Clear can be calculated based on (Clear Pixels)×(IR)×(Illuminant).

For example, for every data point at the same wavelength, a product of the spectral response of a Clear Channel, the spectral response of an Illuminant, and the transmittance (%) of an IR-cut Filter can be calculated. Then, S1_Clear can be the summed area of this product curve with respect to wavelength.

Then, the light received on the panchromatic pixels (C), Light_clear, can be determined by multiplying the signal S1_clear by the weighting percentage $w_e$:

Light_clear=S1_Clear×$w_c$.

To calculate the light received on the chromatic pixels, first, chromatic signals S1_R, S1_G, and S1_B for each type of chromatic pixels can be calculated based on (R,G,B)×(IR)×(Illuminant).

For example, for every data point at the same wavelength, a product of spectral responses of a color channel, an illuminant, and a transmittance (%) of an IR-cut Filter can be calculated. Then, S1_R can be the summed area of the product curve of red channel with respect to wavelength. S1_G can be the summed area of the product curve of green channel with respect to wavelength. S1_B can be the summed area of the product curve of bed channel with respect to wavelength.

Then, the light received on the chromatic pixels (RGB) Light_rgb can be determined by multiplying each signal by its respective weighting percentage and adding the results:

Light_rgb=S1_R×$w_R$+S1_G×$w_G$+S1_B×$w_B$.

Then, the exposure ratio between chromatic pixels and panchromatic pixels can be Light_clear/Light_rgb. For example, if the sensor gain is set to the same for both groups of pixels,

[Exposure Time of Chromatic Pixels]×Light_rgb=
[Exposure Time of Panchromatic Pixels]×Light_clear.

If the exposure time is set to the same for both groups of pixels,

[Sensor Gain of Chromatic Pixels]×Light_rgb=[Sensor Gain of Panchromatic Pixels]×Light_clear.

There are variations of the 4-color-filter camera system shown in the simulation model 800. One variation can use four color filters on four individual sensors, respectively. In this variation, one camera of each of four cameras having one of the four sensors can take pictures for each color channel of the RGBC channels. Another variation can include a camera system having more than four individual sensors, with at least one for each color channel of RGBC. For example 4×4, 5×4, 4×5, 5×5 or more sensors can be used. For example, such a multiple sensor system is described in U.S. Pat. No. 8,514,491, which is incorporated by reference in its entirety.

According to a possible embodiment, for implementation on a camera product, a LUT can be prepared. For example, after camera module specifications are determined, spectral response of sensor channels, such as R, G, B, Clear/panchromatic, and a transmission curve of the IR-cut filter can be known. The spectral responses of various illumination types can be generated by a computer simulator. Then, a LUT table of the exposure ratio vs. the illumination type can be generated for each camera system and stored in memory. For example, a LUT can have the form of:

TABLE 1

| LUT for Exposure Ratio vs. Illumination Type | |
| --- | --- |
| CCT/Illumination Type | Exposure Ratio |
| 2300K/Candlelight | a |
| 2800K/Tungsten Halogen | b |
| 4100K/Fluorescent | c |
| 5000K/Daylight | d |
| 6500K/Daylight Overcast | e |
| 7500K/Shade | f |

The illumination types described in the above LUT can be approximates and can vary depending on the applied illumination type model. The Exposure Ratios (a, b, c, d, e, and f) are represented as variables with the actual values determined according to the embodiments disclosed herein. Also, the table can include more or less varieties of CCT/illumination types and corresponding exposure ratios. If the auto exposure algorithm, and the exposure table of the chromatic pixels are used to find an optimal exposure per scene, then this table of exposure ratio can be designed to find the exposure for the panchromatic pixels, based on the known exposure of chromatic pixels. If the auto exposure algorithm, and the exposure table of the panchromatic pixels are used to find an optimal exposure per scene, then this table of exposure ratio can be designed to find the exposure of the chromatic pixels, based on the known exposure of panchromatic pixels. Alternately, a camera system can generate the exposure ratios on the fly in real time.

During the real-time processing on a camera system, we only need to wait for convergence of the auto exposure algorithm on one group of pixels (chromatic or panchromatic). For example, per still capture, if the auto exposure algorithm converges first on the chromatic pixels, then the exposure time and sensor gain of chromatic pixels can be set by the exposure table and/or the auto exposure algorithm of chromatic pixels. The exposure time and sensor gain of panchromatic pixels can be set by the exposure ratio at the scene illumination type (determined by an Auto White Balance algorithm), according to the LUT. Alternately, as noted above, the exposure ratio can be determined in real time.

Figure 9:
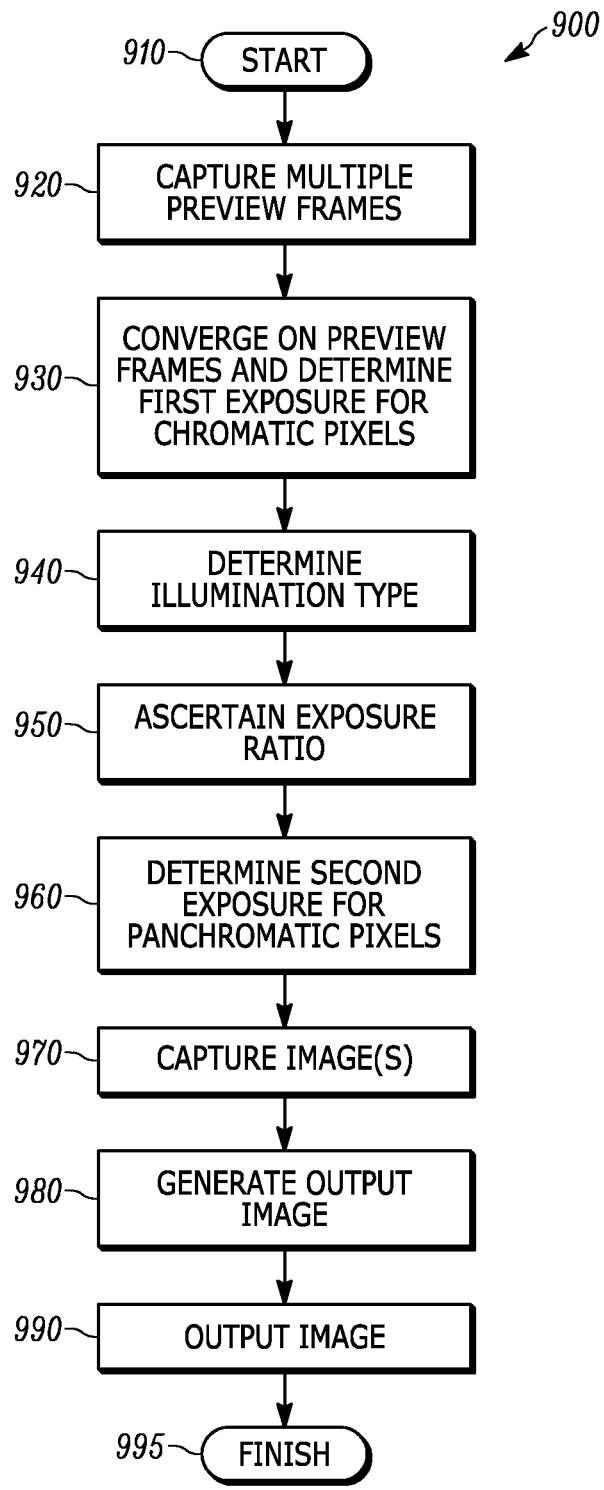
FIG. 9 is an example flowchart illustrating the operation of a camera device according to a possible embodiment.

FIG. 9 is an example flowchart 900 illustrating the operation of a camera device, such as the apparatus 110, according to a possible embodiment. At 910, the flowchart 900 can begin. At 920, multiple preview frames can be captured. At 930, an auto exposure algorithm of chromatic pixels can converges on the multiple preview frames and this algorithm and an exposure table can determine a first exposure for chromatic pixels. For example, a first exposure can be determined for different chromatic pixels that detect different color light. The exposure can be based on a camera capture condition, such as a first exposure condition. The exposure can be based on exposure time, aperture size, pixel sensitivity, and other factors that affect exposure. At 940, an illumination type can be determined for a scene to be captured. For example, the illumination type of the scene can be detected by using an auto white balance algorithm or can be set by a user.

At 950, an exposure ratio between chromatic pixels and panchromatic pixels can be ascertained based on the illumination type of the scene. The exposure ratio can be ascertained by calculating the exposure ratio, by retrieving the exposure ratio from a table, or by any other operation for ascertaining an exposure ratio. The exposure ratio can be based on a ratio between the received light of the different chromatic pixels and the received light of the panchromatic pixels for a given illumination type. Additionally, the exposure ratio can be based on a ratio between weighted received light of the different chromatic pixels and a weighted received light of the panchromatic pixels for a given illumination type. The weighting can be based on a percentage of the number of pixels of each color of the chromatic pixels used for the image and a percentage of the number of panchromatic pixels. Furthermore, the received light of pixels can be based on a summed area of a product curve of a spectral response of a color channel of pixels, a spectral response of a given illumination type, and a transmittance of an infrared cut-off filter.

At 960, a second exposure can be determined for panchromatic pixels that detect panchromatic light. The first exposure can be different from the second exposure based on an exposure ratio between the chromatic pixels and the panchromatic pixels. According to a possible implementation, the first exposure can provide greater exposure for the different chromatic pixels than the exposure for the panchromatic pixels. For example, the first exposure can provide a longer exposure time for the different chromatic pixels, a higher sensor sensitivity for the different chromatic pixels, a larger aperture for the different chromatic pixels, or otherwise provide greater exposure for the different chromatic pixels than for the second exposure for the panchromatic pixels based on the exposure ratio and reciprocally for the second exposure in relation to the first exposure. The first exposure can be determined before the second exposure and the exposure ratio can be used to determine the second exposure based on the first exposure. Alternately, the second exposure can be determined before the first exposure and the exposure ratio can be used to determine the first exposure based on the second exposure.

According to a possible implementation, when determining the exposure for the pixels, the same sensor gain can be set for the different chromatic pixels as the panchromatic pixels. Then, the exposure time of the chromatic pixels can be set based on the first exposure and the exposure time of the panchromatic pixels can be set based on the second exposure or reciprocally for the first exposure based on the second exposure. According to another possible implementation, when determining the exposure for the pixels, the same exposure time can be set for the different chromatic pixels as the panchromatic pixels. Then, the sensor gain of the chromatic pixels can be set based on the first exposure and the sensor gain of the panchromatic pixels can be set based on the second exposure or reciprocally for the first exposure based on the second exposure. Other possible implementations can use different combinations of sensor gain, exposure time, aperture size, and other factors to set the exposure of the chromatic pixels and the panchromatic pixels.

At 970, at least one image of a scene can be captured using the first exposure for the different chromatic pixels and the second exposure for the panchromatic pixels. According to a possible implementation, the different chromatic pixels and the panchromatic pixels can be on the same sensor or in the same camera. According to another possible implementation, the different chromatic pixels can be on a different camera or sensor from the panchromatic pixels, and the different chromatic pixels may even be on different sensors or cameras from other chromatic pixels. For example, the different chromatic pixels can be pixels on a first sensor in a first camera and the panchromatic pixels can be pixels on a second sensor in a second camera. Then, capturing at least one image can include capturing a first image using the different chromatic pixels on the first sensor in the first camera at the first exposure and capturing a second image using the panchromatic pixels on the second sensor in the second camera or vice versa. Then, the first and second images can be combined to generate the at least one image.

At 980, an output image can be generated. For example, an Image Signal Processor (ISP) can process the chromatic and panchromatic pixels to generate one output image. At 990, the image can be output. For example, the image can be output to a display, to memory, to a printer, to another device via a transceiver, and/or can otherwise be output. At 995, the flowchart 900 can end.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 10:
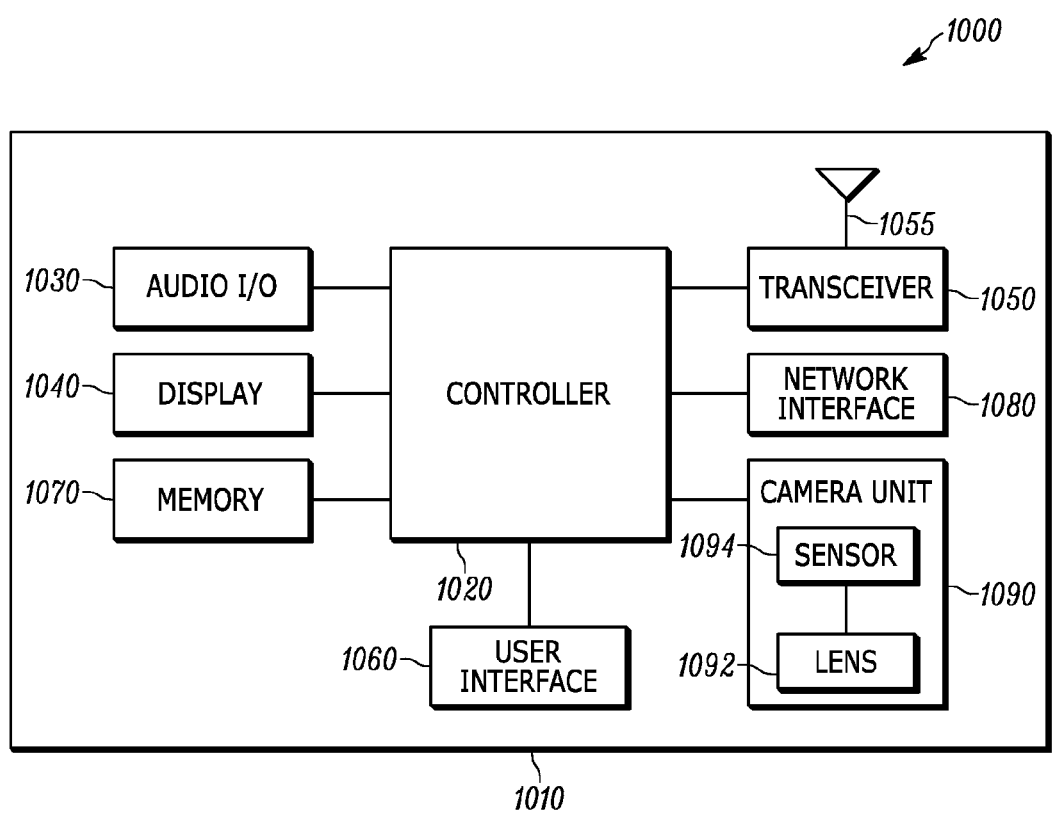
FIG. 10 is an example block diagram of an apparatus according to a possible embodiment.

FIG. 10 is an example block diagram of an apparatus 1000, such as the apparatus 110, according to a possible embodiment. The apparatus 1000 can include a housing 1010, a controller 1020 within the housing 1010, audio input and output circuitry 1030 coupled to the controller 1020, a display 1040 coupled to the controller 1020, a transceiver 1050 coupled to the controller 1020, an antenna 1055 coupled to the transceiver 1050, a user interface 1060 coupled to the controller 1020, a memory 1070 coupled to the controller 1020, and a network interface 1080 coupled to the controller 1020. The apparatus 1000 can also include at least one camera 1090, such as the camera unit 120, the camera unit 210, the camera units 610 and 640, the camera unit 810, and/or any other camera or camera unit. The camera 1090 can include a lens 1092 and a sensor 1094. The apparatus 1000 does not require all of the elements shown depending on the implementation of the apparatus 1000, such as on a standalone camera vs. a smartphone. The apparatus 1000 can perform the methods described in all the embodiments.

The display 1040 can include multiple displays and can be a viewfinder, a liquid crystal display (LCD), a light emitting diode (LED) display, a plasma display, a projection display, a touch screen, an LED flash, or any other device or combination of devices that display information and/or output light. The transceiver 1050 can include a transmitter and/or a receiver. The audio input and output circuitry 1030 can include a microphone, a speaker, a transducer, or any other audio input and output circuitry. The user interface 1060 can include a keypad, a keyboard, buttons, a touch pad, a joystick, a touch screen display, another additional display, or any other device useful for providing an interface between a user and an electronic device. The network interface 1080 can be a Universal Serial Bus (USB) port, an Ethernet port, an infrared transmitter/receiver, an IEEE 13910 port, a WLAN transceiver, or any other interface that can connect an apparatus to a network, device, or computer and that can transmit and receive data communication signals. The memory 1070 can include a random access memory, a read only memory, an optical memory, a flash memory, a removable memory, a hard drive, a cache, or any other memory that can be coupled to a wireless communication device.

The apparatus 1000 or the controller 1020 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 1070 or elsewhere on the apparatus 1000. The apparatus 1000 or the controller 1020 may also use hardware to implement disclosed operations. For example, the controller 1020 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1020 may be any controller or processor device or devices capable of operating a wireless communication device and implementing the disclosed embodiments. As further examples, the controller can include a processor, can include an image signal processor, can include auto exposure synchronization logic, can include software, can include hardware, and/or can include or be any other controller that is capable of performing the operations disclosed in the embodiments.

In operation, the sensor 1094 of the at least one camera 1090 can sense, such as detect, different color light on different chromatic pixels and panchromatic light on panchromatic pixels. The panchromatic pixels and the chromatic pixels can be pixels on a same sensor on a camera unit or pixels on separate sensors on separate camera units. The controller 1020 can detect an illumination type of a scene and ascertain an exposure ratio between the chromatic pixels and the panchromatic pixels based on the illumination type of the scene.

The controller 1020 can determine a first exposure for the different chromatic pixels and a second exposure for the panchromatic pixels. The first exposure can be different from the second exposure based on the exposure ratio between the chromatic pixels and the panchromatic pixels. The first exposure can provide greater exposure for the different chromatic pixels than the exposure for the panchromatic pixels.

The exposure ratio can be based on a ratio between the received light of the different chromatic pixels and the received light of the panchromatic pixels for a given illumination type. The exposure ratio can be further based on a ratio between the weighted received light of the different chromatic pixels and a weighted received light of the panchromatic pixels for a given illumination type. The weighting can be based on a percentage of the number of pixels of each color of the chromatic pixels used for the image and a percentage of the number of panchromatic pixels. The received light of pixels can be based on the summed area of a product curve of a spectral response of a color channel of pixels, a spectral response of a given illumination type, and a transmittance of an infrared cut-off filter. According to a possible implementation, the controller 1020 can set the same sensor gain of the chromatic pixels as the panchromatic pixels, set the exposure time of the chromatic pixels based on the first exposure, and set the exposure time of the panchromatic pixels based on the second exposure that is based on the exposure ratio. According to another possible implementation, the controller 1020 can set the same exposure time of the chromatic pixels and the panchromatic pixels, set the sensor gain of the chromatic pixels based on the first exposure, and set the sensor gain of the panchromatic pixels based on the second exposure that is based on the exposure ratio. Similarly, the controller 1020 can first set the sensor gain, exposure time, aperture size, or other exposure component of the panchromatic pixels first and then set the other respective exposure component of the chromatic pixels based on the exposure component of the panchromatic pixels that is based on the exposure ratio.

The at least one camera 1090 can capture an image of a scene using the first exposure for the different chromatic pixels and the second exposure for the panchromatic pixels simultaneously. The controller 1090 can combine the first and second images to generate the at least one image. The controller 1090 can output the at least one image, such as to the display 1040, to the memory 1070, over the network interface 1080, such as to a printer, via the transceiver 1050, and/or otherwise output the at least one image.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:
1. A method comprising:
   determining a first exposure for different chromatic pixels that detect different color light;
   detecting an illumination type of a scene;

ascertaining an exposure ratio between the chromatic pixels and panchromatic pixels based on the illumination type of the scene;

determining a second exposure for the panchromatic pixels that detect panchromatic light, where the first exposure is different from the second exposure based on the exposure ratio between the chromatic pixels and the panchromatic pixels; and capturing at least one image of the scene using the first exposure for the different chromatic pixels and the second exposure for the panchromatic pixels.

2. The method according to claim 1, wherein the first exposure provides greater exposure for the different chromatic pixels than the exposure for the panchromatic pixels.

3. The method according to claim 1, wherein the exposure ratio is based on a ratio between the received light of the different chromatic pixels and the received light of the panchromatic pixels for a given illumination type.

4. The method according to claim 3, wherein the exposure ratio is based on a ratio between weighted received light of the different chromatic pixels and a weighted received light of the panchromatic pixels for a given illumination type, where the weighting is based on a percentage of the number of pixels of each color of the chromatic pixels used for the image and a percentage of the number of panchromatic pixels.

5. The method according to claim 3, wherein the received light of pixels is based on a summed area of a product curve of a spectral response of a color channel of pixels, a spectral response of a given illumination type, and a transmittance of an infrared cut-off filter.

6. The method according to claim 1, further comprising:
setting the same sensor gain for the different chromatic pixels as the panchromatic pixels;
setting the exposure time of the chromatic pixels based on the first exposure; and
setting the exposure time of the panchromatic pixels based on the second exposure.

7. The method according to claim 1, further comprising:
setting the same exposure time for the different chromatic pixels as the panchromatic pixels;
setting the sensor gain of the chromatic pixels based on the first exposure; and
setting the sensor gain of the panchromatic pixels based on the second exposure.

8. The method according to claim 1,
wherein the different chromatic pixels are pixels on a first sensor in a first camera,
wherein the panchromatic pixels are pixels on a second sensor in a second camera, and
wherein capturing at least one image comprises capturing a first image using the different chromatic pixels on the first sensor in the first camera at the first exposure and, at the same instant, capturing a second image using the panchromatic pixels on the second sensor in the second camera.

9. The method according to claim 8, further comprising combining the first and second images to generate the at least one image.

10. The method according to claim 1, wherein the panchromatic pixels and the chromatic pixels are pixels on a same sensor in a camera.

11. The method according to claim 1, further comprising outputting the at least one image.

12. An apparatus, comprising:
at least one camera unit comprising a lens and a sensor, the sensor of the at least one camera unit operable to sense different color light on different chromatic pixels and panchromatic light on panchromatic pixels; and a controller, operatively coupled to the at least one camera, the controller operative to:
detect an illumination type of a scene,
ascertain an exposure ratio between the chromatic pixels and the panchromatic pixels based on the illumination type of the scene, and
determine a first exposure for the different chromatic pixels and a second exposure for the panchromatic pixels, where the first exposure is different from the second exposure based on the exposure ratio between the chromatic pixels and the panchromatic pixels, wherein the at least one camera simultaneously captures an image of the scene using the first exposure for the different chromatic pixels and the second exposure for the panchromatic pixels.

13. The apparatus according to claim 12, wherein the first exposure provides greater exposure for the different chromatic pixels than the exposure for the panchromatic pixels.

14. The apparatus according to claim 12, wherein the exposure ratio is based on a ratio between the received light of the different chromatic pixels and the received light of the panchromatic pixels for a given illumination type.

15. The apparatus according to claim 14, wherein the exposure ratio is based on a ratio between weighted received light of the different chromatic pixels and a weighted received light of the panchromatic pixels for a given illumination type, where the weighting is based on a percentage of the number of pixels of each color of the chromatic pixels used for the image and a percentage of the number of panchromatic pixels.

16. The apparatus according to claim 14, wherein the received light of pixels is based on a summed area of a product curve of a spectral response of a color channel of pixels, a spectral response of a given illumination type, and a transmittance of an infrared cut-off filter.

17. The apparatus according to claim 12, wherein the controller is operative to set the same sensor gain of the chromatic pixels as the panchromatic pixels, set the exposure time of the chromatic pixels based on the first exposure, and set the exposure time of the panchromatic pixels based on the second exposure.

18. The apparatus according to claim 12, wherein the controller is operative to set the same exposure time of the chromatic pixels and the panchromatic pixels, set the sensor gain of the chromatic pixels based on the first exposure, and set the sensor gain of the panchromatic pixels based on the second exposure.

19. The apparatus according to claim 12,
wherein the at least one camera comprises:
a first camera including a first lens and a first sensor, the first sensor operable to sense different color light on different chromatic pixels and operable to capture a first image of the scene on the different chromatic pixels using the first exposure for the different chromatic pixels; and
a second camera including a second lens and a second sensor, the second sensor operable to sense panchromatic light on panchromatic pixels and operable to capture a second image of the scene on the panchromatic pixels using the second exposure for the panchromatic pixels.

20. The apparatus according to claim 19, wherein the controller is configured to combine the first and second images to generate the at least one image.

21. The apparatus according to claim 12, wherein the panchromatic pixels and the chromatic pixels are pixels on a same sensor on a camera unit.

22. The apparatus according to claim 12, wherein the controller is configured to output the at least one image.

* * * * *